(12) United States Patent
Nakamura et al.

(10) Patent No.: US 8,477,587 B2
(45) Date of Patent: Jul. 2, 2013

(54) OPTICAL PICKUP DEVICE AND OBJECTIVE OPTICAL ELEMENT

(75) Inventors: Kentarou Nakamura, Hachioji (JP); Tohru Kimura, Hachioji (JP)

(73) Assignee: Konica Minolta Opto, Inc., Tokyo (JP)

( * ) Notice: Subject to any disclaimer, the term of this patent is extended or adjusted under 35 U.S.C. 154(b) by 763 days.

(21) Appl. No.: 12/597,160

(22) PCT Filed: Apr. 8, 2008

(86) PCT No.: PCT/JP2008/056932
§ 371 (c)(1),
(2), (4) Date: Oct. 22, 2009

(87) PCT Pub. No.: WO2008/136242
PCT Pub. Date: Nov. 13, 2008

(65) Prior Publication Data
US 2010/0124159 A1 May 20, 2010

(30) Foreign Application Priority Data
Apr. 27, 2007 (JP) .................. 2007-118063

(51) Int. Cl.
*G11B 7/135* (2012.01)
(52) U.S. Cl.
USPC .................................... 369/112.26
(58) Field of Classification Search
None
See application file for complete search history.

(56) References Cited

U.S. PATENT DOCUMENTS

| | | |
|---|---|---|
| 6,118,594 A | 9/2000 | Maruyama |
| 2005/0078593 A1 | 4/2005 | Maruyama et al. |
| 2005/0168821 A1 | 8/2005 | Ikenaka |
| 2006/0114796 A1 | 6/2006 | Maruyama et al. |
| 2006/0146422 A1 | 7/2006 | Koike |
| 2006/0280061 A1 | 12/2006 | Koreeda et al. |
| 2007/0014211 A1 | 1/2007 | Koreeda et al. |

FOREIGN PATENT DOCUMENTS

| | | |
|---|---|---|
| JP | 2004-247025 | 9/2004 |
| JP | 2005-38585 | 2/2005 |
| JP | 2005-209321 | 8/2005 |
| JP | 2006-185576 | 7/2006 |

*Primary Examiner* — Christopher R Lamb
(74) *Attorney, Agent, or Firm* — Cozen O'Connor

(57) ABSTRACT

There are provided an optical pickup device which can satisfactorily record and/or reproduce information on different kinds of optical information recording medium in spite of compactness, and an objective optical element used for the optical pickup device. The optical functional surface of the objective optical element includes at least two areas of a central area including an optical axis and a peripheral area surrounding the central area. An optical path difference providing structure in the central area is a structure obtained by overlapping a first central basic structure and a second central basic structure which are in a shape of ring-shaped zones divided by step differences, with each other. An optical path difference providing structure in the peripheral area is a structure obtained by overlapping a first peripheral basic structure and a second peripheral basic structure which are in a shape of ring-shaped zones divided by step differences, with each other.

21 Claims, 2 Drawing Sheets

OPTICAL PICKUP DEVICE AND OBJECTIVE OPTICAL ELEMENT

This is a U.S. National Phase under 35 U.S.C. §371 of International Application PCT/JP2008/056932, filed on Apr. 8, 2008, and claims priority on Japanese Application No. 2007-118063, filed on Apr. 27, 2007, the entire content of which is hereby incorporated by reference.

TECHNICAL FIELD

The present invention relates to an optical pickup device and an objective optical element. In particular, the present invention relates to an optical pickup device capable of recording and/or reproducing information properly for information recording media by using light sources with a different wavelengths, and to an objective optical element to be used for the optical pickup device.

BACKGROUND ART

In recent years, research and development of a high density optical disc system capable of recording and/or reproducing information by using a violet semiconductor laser with a wavelength of about 400 nm, are advancing rapidly. As an example, in the case of an optical disc on which information is recorded and/or reproduced under the specifications that NA is 0.85 and a light source wavelength is 405 nm, namely, in the case of the so-called Blu-ray Disc (hereinafter, BD), it is possible to record information of about 23 through 27 GB per layer for an optical disc with a diameter of 12 cm, which is same in size as DVD (NA is 0.6, wavelength of a light source is 650 nm, and memory capacity is 4.7 GB). As another example, in the case of an optical disc on which information is recorded and/or reproduced under the specifications that NA is 0.65 and a light source wavelength is 405 nm, namely, in the case of the so-called HD DVD (hereinafter, HD), it is possible to record information of about 15 through 20 GB per layer for an optical disc with a diameter of 12 cm. With respect to BD, coma caused by inclination (skew) of an optical disc is increased. Therefore, an amount of the coma caused by skew is lowered by designing the protective layer to be thinner than that in the case of DVD (where the thickness is 0.1 mm, compared with 0.6 mm for DVD). Hereafter, the optical disc of this kind is called "a high density optical disc" in the present description.

In the meantime, a value as a product for an optical disc player/recorder is not sufficient when the optical disc player/recorder only can record and/or reproduce information properly for the high density disc of this kind. In view of the realities that DVDs on which various types of information are recorded are on the market at present, only conducting information recording and/or information reproducing is not sufficient for the high density optical disc, and ability to conduct information recording and/or information reproducing properly also for DVD owned by a user, for example, enhances commercial value as the optical disc player/recorder for the high density optical disc. With the aforesaid background, an optical pickup device to be built in the optical disc player/recorder for a high density optical disc is requested to have capability to conduct information recording and/or information reproducing properly for both a high density optical disc and DVD also, while maintaining a compatibility.

As a method to be capable of recording and/or reproducing information for both of the high density optical disc and DVD also while maintaining compatibility, there is considered a method to switch an optical system for a high density optical disc and an optical system for DVD selectively, depending on recording density of an optical disc for information recording and/or information reproducing. However, this method is disadvantageous for downsizing because a plurality of optical systems are needed, and this method cannot avoid cost increase.

Therefore, it is preferable to simplify construction of the optical pickup device, and to reduce the number of optical parts constituting the optical pickup device by providing an optical system for a high density optical disc and that for DVD as a common optical system even in the optical pickup device with a compatibility, for achieving low cost. Most advantageous ways for simplification and low cost of the construction of the optical pickup device includes providing an objective lens arranged to face an optical disc as a common optical element and further making this objective lens a single lens. As an objective lens that is common to optical discs in plurality of types each being different in recording/reproducing wavelength, there is known an objective lens that has, on its surface, a diffractive structure having wavelength-dependency of an spherical aberration, and that corrects a spherical aberration caused by a difference in recording/reproducing wavelength and in a protective layer thickness, by utilizing the wavelength-dependency of this diffractive structure.

Patent Literature 1 discloses an objective lens in a single lens structure that can record and/or reproduce information compatibly for a high density optical disc, DVD and CD.

Patent Literature 1: JP-A No. 2006-185576

DISCLOSURE OF INVENTION

Technical Problem

In the objective lens disclosed in Patent Literature 1, the central area and the peripheral area of the objective lens differ in an order of a diffracted light flux having a maximum light amount in light fluxes passing therein. Therefore, there is a problem that higher order aberration that does not contribute to a spot cannot be lowered sufficiently for both of a high density optical disk and DVD.

The present invention has been achieved in view of the aforesaid problems, to provide an optical pickup device wherein the higher order aberration can be lowered sufficiently for both a high density optical disc and DVD, and information recording and/or information reproducing can be conducted properly for optical information recording media which are different in terms of types each other with keeping compactness, and to provide an objective optical element to be used for the aforesaid optical pickup device.

Solution to Problem

Item 1 describes an optical pickup device which forms a converged spot on an information recording surface of a first optical information recording medium including a protective layer with a thickness of t1, by using a first light flux with a wavelength of $\lambda 1$ emitted from a first light source, forms a converged spot on an information recording surface of a second optical information recording medium including a protective layer with a thickness of t1 ($t1 \leqq t2$), by using a second light flux with a wavelength of $\lambda 2$ ($\lambda 1 < \lambda 2$) emitted from a second light source, and forms a converged spot on an information recording surface of a third optical information recording medium including a protective layer with a thickness of t3 ($t2 < t3$), by using a third light flux with a wavelength of $\lambda 3$ ($1.9 \times \lambda 1 < \lambda 3 < 2.1 \times \lambda 1$) emitted from a third light source. The optical pickup device comprises: an objective optical element being a single lens. In the optical pickup device, m1, m2, and m3 have an almost same value to each other, where m1, m2, and m3 are magnifications for the first light flux, the second light flux, and the third light flux which enter the objective optical element, respectively. The objective optical element comprises an optical functional surface including at least two areas of a central area including an optical axis and a peripheral area surrounding the central area. The central area is used for forming the converged spot on each of the information recording surfaces of the first optical information recording medium, the second optical information recording medium, and the third optical information recording medium, and the peripheral area is used for forming the converged spot on only the information recording surfaces of the first optical information recording medium and the second optical information recording medium out of the first optical information recording medium, the second optical information recording medium and the third optical information recording medium. The central area comprises a first central basic structure being a structure in a shape of ring-shaped zones divided by step differences and a second central basic structure being a structure in a shape of ring-shaped zones divided by step differences, where the first central basic structure and the second central basic structure are formed to be overlapped with each other. In the first central basic structure, an a-th order diffracted light flux has a higher light intensity than other order diffracted light fluxes when the first light flux passes through the first central basic structure, a b-th order diffracted light flux has a higher light intensity than other order diffracted light fluxes when the second light flux passes through the first central basic structure, and a c-th order diffracted light flux has a higher light intensity than other order diffracted light fluxes when the third light flux passes through the first central basic structure. In the second central basic structure, a x-th order diffracted light flux has a higher light intensity than other order diffracted light fluxes when the first light flux passes through the second central basic structure, a y-th order diffracted light flux has a higher light intensity than other order diffracted light fluxes when the second light flux passes through the second central basic structure, and a z-th order diffracted light flux has a higher light intensity than other order diffracted light fluxes when the third light flux passes through the second central basic structure. The peripheral area comprises a first peripheral basic structure being a structure in a shape of ring-shaped zones divided by step differences and a second peripheral basic structure being a structure in a shape of ring-shaped zones divided by step differences, where the first peripheral basic structure and the second peripheral basic structure are formed to be overlapped with each other. In the first peripheral basic structure, an a-th order diffracted light flux has a higher light intensity than other order diffracted light fluxes when the first light flux passes through the first peripheral basic structure, and a b-th order diffracted light flux has a higher light intensity than other order diffracted light fluxes when the second light flux passes through the first peripheral basic structure. In the second peripheral basic structure, a x-th order diffracted light flux has a higher light intensity than other order diffracted light fluxes when the first light flux passes through the second peripheral basic structure, and a y-th order diffracted light flux has a higher light intensity than other order diffracted light fluxes when the second light flux passes through the second peripheral basic structure. Values of a and x are an odd number and an even number, respectively.

According to the present invention, phase difference is not caused between a light flux passing through the central area and a light flux passing through the peripheral area. It reduces the higher aberration for both of the first optical information recording medium and the second optical information recording medium, and a converged spot in a good condition can be formed for information recording surfaces of both optical information recording media. Further, since each of the first and second central basic structures and the first and second peripheral basic structures is provided as a structure in a serrated shape, they have many inclined surfaces to the optical axis compared with using a structure in a stair shape and a structure in a binary shape. It reduces step differences parallel with the optical axis and large step differences, eases a processability of a mold for manufacturing optical elements, and reduces a manufacturing cost. Moreover, it enhance the transferring ability of the structure shape and reduce a problem about loss of light amount in accordance with manufacturing errors such as a surface deformation.

Item 2 describes the optical pickup device wherein, in the invention described in item 1, the following expressions (1), (2), and (3) are satisfied.

$$-0.02 < m1 < 0.02 \tag{1}$$

$$-0.02 < m2 < 0.02 \tag{2}$$

$$-0.02 < m3 < 0.02 \tag{3}$$

Item 3 describes the optical pickup device wherein, the invention described in item 1 or 2, the following relationships are satisfied:

$$a=3, b=2, c=2 \text{ or } 1,$$

$$x=2, y=1, z=1.$$

Item 4 describes the optical pickup device wherein, the invention described in items 1 or 2, the following relationships are satisfied:

$$a=1, b=1, c=1,$$

$$x=2, y=1, z=1.$$

Item 5 describes the optical pickup device wherein, the invention described in any one of items 1 to 4, an average pitch of a structure formed by the first central basic structure and the second central basic structure overlapped with each other, is larger than an average pitch of a structure formed by the first peripheral basic structure and the second peripheral basic structure overlapped with each other.

Item 6 describes an optical pickup device which forms a converged spot on an information recording surface of a first optical information recording medium including a protective layer with a thickness of t1, by using a first light flux with a wavelength of $\lambda 1$ emitted from a first light source, forms a converged spot on an information recording surface of a second optical information recording medium including a protective layer with a thickness of t2 (t1$\leq$t2), by using a second light flux with a wavelength of $\lambda 2$ ($\lambda 1 < \lambda 2$) emitted from a second light source, and forms a converged spot on an information recording surface of a third optical information recording medium including a protective layer with a thickness of t3 (t2<t3), by using a third light flux with a wavelength of $\lambda 3$ ($1.9 \times \lambda 1 < \lambda 3 < 2.1 \times \lambda 1$) emitted from a third light source. The optical pickup device comprises: an objective optical element being a single lens. In the optical pickup device, m1, m2, and m3 have an almost same value to each other, where m1, m2, and m3 are magnifications for the first light flux, the second light flux, and the third light flux which enter the objective optical element, respectively. The objective optical element comprises an optical functional surface including at least two areas of a central area including an optical axis and a peripheral area surrounding the central area. The central area is used for forming the converged spot on each of the information recording surfaces of the first optical information recording medium, the second optical information recording medium, and the third optical information recording medium, and the peripheral area is used for forming the converged spot on only the information recording surfaces of the first optical information recording medium and the second optical information recording medium out of the first optical information recording medium, the second optical information recording medium and the third optical information recording medium. Each of the central area and the peripheral area comprises a structure in a shape of ring-shaped zones divided by step differences, and step differences between adjoining ring-shaped zones in the central area and/or the peripheral area have at least two types of length along an optical axis out of d1 (μm), d2 (μm), and d3 (μm) satisfying the expressions (4), (5), and (6) respectively.

$$1.6<|d1[1-n\cdot\cos\{\theta-\arcsin(\sin\theta/n)\}]/\lambda 1|<2.4 \quad (4)$$

$$2.6<|d2[1-n\cdot\cos\{\theta-\arcsin(\sin\theta/n)\}]/\lambda 1|<3.4 \quad (5)$$

$$4.6<|d3[1-n\cdot\cos\{\theta-\arcsin(\sin\theta/n)\}]/\lambda 1|<5.4 \quad (6)$$

In these expressions, n is a refractive index of the objective lens for a light flux with the wavelength λ1 (μm), and θ is a surface angle of a base aspheric surface of an optical surface of the objective lens, at the step difference.

Item 7 describes the optical pickup device wherein, in the invention described in item 6, the step differences of the ring-shaped zones have at least two types of length along the optical axis out of d1 (μm), d2 (μm), and d3 (μm) satisfying the expressions (4'), (5'), and (6') respectively.

$$1.8<|d1[1-n\cdot\cos\{\theta-\arcsin(\sin\theta/n)\}]/\lambda 1|<2.2 \quad (4')$$

$$2.9<|d2[1-n\cdot\cos\{\theta-\arcsin(\sin\theta/n)\}]/\lambda 1|<3.3 \quad (5')$$

$$4.8<|d3[1-n\cdot\cos\{\theta-\arcsin(\sin\theta/n)\}]/\lambda 1|<5.2 \quad (6')$$

Item 8 describes an optical pickup device which forms a converged spot on an information recording surface of a first optical information recording medium including a protective layer with a thickness of t1, by using a first light flux with a wavelength of λ1 emitted from a first light source, forms a converged spot on an information recording surface of a second optical information recording medium including a protective layer with a thickness of t2 (t1≦t2), by using a second light flux with a wavelength of λ2 (λ1<λ2) emitted from a second light source, and forms a converged spot on an information recording surface of a third optical information recording medium including a protective layer with a thickness of t3 (t2<t3), by using a third light flux with a wavelength of λ3 (1.9×λ1<λ3<2.1×λ1) emitted from a third light source. The optical pickup device comprises: an objective optical element being a single lens. In the optical pickup device, m1, m2, and m3 have an almost same value to each other, where m1, m2, and m3 are magnifications for the first light flux, the second light flux, and the third light flux which enter the objective optical element, respectively. The objective optical element comprises an optical functional surface including at least two areas of a central area including an optical axis and a peripheral area surrounding the central area. The central area is used for forming the converged spot on each of the information recording surfaces of the first optical information recording medium, the second optical information recording medium, and the third optical information recording medium, and the peripheral area is used for forming the converged spot on only the information recording surfaces of the first optical information recording medium and the second optical information recording medium out of the first optical information recording medium, the second optical information recording medium and the third optical information recording medium. Each of the central area and the peripheral area comprises a structure in a shape of ring-shaped zones divided by step differences, and step differences between adjoining ring-shaped zones in the central area and/or the peripheral area have at least two types of length along an optical axis out of d1 (μm), d2 (μm), and d3 (μm) satisfying the expressions (7), (8), and (9) respectively.

$$0.7<|d1[1-n\cdot\cos\{\theta-\arcsin(\sin\theta/n)\}]/\lambda 1|<1.5 \quad (7)$$

$$1.6<|d2[1-n\cdot\cos\{\theta-\arcsin(\sin\theta/n)\}]/\lambda 1|<2.4 \quad (8)$$

$$2.6<|d3[1-n\cdot\cos\{\theta-\arcsin(\sin\theta/n)\}]/\lambda 1|<3.4 \quad (9)$$

In the expressions, n is a refractive index of the objective lens for a light flux with the wavelength λ1, (μm), and θ is a surface angle of a base aspheric surface of an optical surface of the objective lens, at the step difference.

Item 9 describes the optical pickup device wherein, in the invention described in item 8, the step differences of the ring-shaped zones have at least two types of length along the optical axis out of d1 (μm), d2 (μm), and d3 (μm) satisfying the expressions (7'), (8'), and (9') respectively.

$$0.9<|d1[1-n\cdot\cos\{\theta-\arcsin(\sin\theta/n)\}]/\lambda 1|<1.3 \quad (7')$$

$$1.8<|d2[1-n\cdot\cos\{\theta-\arcsin(\sin\theta/n)\}]/\lambda 1|<2.2 \quad (8')$$

$$2.8<|d3[1-n\cdot\cos\{\theta-\arcsin(\sin\theta/n)\}]/\lambda 1|<3.2 \quad (9')$$

Item 10 describes the optical pickup device wherein, in the invention described in any one of items 1 to 9, an optical surface on which the ring-shaped zones are formed faces a light-source side.

Item 11 describes the optical pickup device, in the invention described in any one of items 1 to 10, further comprising a most peripheral area surrounding the peripheral area, wherein the most peripheral area is used for forming a converged spot only on the information recording surface of the second optical information recording medium.

Item 12 describes the optical pickup device, in the invention described in any one of items 1 to 10, further comprising a most peripheral area surrounding the peripheral area, wherein the most peripheral area is used for forming a converged spot only on the information recording surface of the first optical information recording medium.

Item 13 describes the optical pickup device wherein, in the invention described in any one of items 1 to 12, each of the first central basic structure, the second central basic structure, the first peripheral basic structure, and the second peripheral basic structure is a diffractive structure in a serrated shape.

Item 14 describes the optical pickup device wherein, the invention described in any one of items 1 to 13, the thickness t1 of the protective layer of the first optical information recording medium satisfies 0.5 mm≦t1≦0.7 mm, the thickness t2 of the protective layer of the second optical information recording medium satisfies 0.5 mm≦t2≦0.7 mm, and the thickness t3 of the protective layer of the third optical information recording medium satisfies 1.1 mm≦t3≦1.3 min.

Item 15 describes that the optical pickup device wherein, the invention described in any one of items 1 to 13, the thickness t1 of the protective layer of the first optical information recording medium satisfies 0.0750 mm≦t1≦0.1125 mm, the thickness t2 of the protective layer of the second optical information recording medium satisfies 0.5 mm≦t2≦0.7 mm, and the thickness t3 of the protective layer of the third optical information recording medium satisfies 1.1 mm≦t3≦1.3 mm.

Item 16 describes the optical pickup device wherein, the invention described in any one of items 1 to 15, the objective optical element comprises a glass material.

Item 17 describes the optical pickup device wherein, the invention described in any one of items 1 to 15, the objective optical element comprises a plastic material.

Item 18 describes an objective optical element for use in an optical pickup device which forms a converged spot on an information recording surface of a first optical information recording medium including a protective layer with a thickness of t1, by using a first light flux with a wavelength of λ1 emitted from a first light source, forms a converged spot on an information recording surface of a second optical information recording medium including a protective layer with a thickness of t2 (t1≦t2), by using a second light flux with a wavelength of λ2 (λ1<λ2) emitted from a second light source, and forms a converged spot on an information recording surface of a third optical information recording medium including a protective layer with a thickness of t3 (t2<t3), by using a third light flux with a wavelength of λ3 (1.9×λ1<λ3<2.1×λ1) emitted from a third light source. The objective optical element is a single lens, and comprises an optical functional surface including at least two areas of a central area including an optical axis and a peripheral area surrounding the central area. The central area is used for forming the converged spot on each of the information recording surfaces of the first optical information recording medium, the second optical information recording medium, and the third optical information recording medium, and the peripheral area is used for forming the converged spot on only the information recording surfaces of the first optical information recording medium and the second optical information recording medium out of the first optical information recording medium, the second optical information recording medium and the third optical information recording medium. The central area comprises a first central basic structure being a structure in a shape of ring-shaped zones divided by step differences and a second central basic structure being a structure in a shape of ring-shaped zones divided by step differences, where the first central basic structure and the second central basic structure are formed to be overlapped with each other. In the first central basic structure, an a-th order diffracted light flux has a higher light intensity than other order diffracted light fluxes when the first light flux passes through the first central basic structure, a b-th order diffracted light flux has a higher light intensity than other order diffracted light fluxes when the second light flux passes through the first central basic structure, and a c-th order diffracted light flux has a higher light intensity than other order diffracted light fluxes when the third light flux passes through the first central basic structure. In the second central basic structure, a x-th order diffracted light flux has a higher light intensity than other order diffracted light fluxes when the first light flux passes through the second central basic structure, a y-th order diffracted light flux has a higher light intensity than other order diffracted light fluxes when the second light flux passes through the second central basic structure, and a z-th order diffracted light flux has a higher light intensity than other order diffracted light fluxes when the third light flux passes through the second central basic structure. The peripheral area comprises a first peripheral basic structure being a structure in a shape of ring-shaped zones divided by step differences and a second peripheral basic structure being a structure in a shape of ring-shaped zones divided by step differences, where the first peripheral basic structure and the second peripheral basic structure are formed to be overlapped with each other. In the first peripheral basic structure, an a-th order diffracted light flux has a higher light intensity than other order diffracted light fluxes when the first light flux passes through the first peripheral basic structure, and a b-th order diffracted light flux has a higher light intensity than other order diffracted light fluxes when the second light flux passes through the first peripheral basic structure. In the second peripheral basic structure, a x-th order diffracted light flux has a higher light intensity than other order diffracted light fluxes when the first light flux passes through the second peripheral basic structure, and a y-th order diffracted light flux has a higher light intensity than other order diffracted light fluxes when the second light flux passes through the second peripheral basic structure. Values of a and x are an odd number and an even number, respectively.

Item 19 describes the objective optical element wherein, in the invention described in item 18, the objective optical element is used in the optical pickup device in which m1, m2, and m3 have an almost same value to each other, where m1, m2, and m3 are magnifications for the first light flux, the second light flux, and the third light flux which enter the objective optical element, respectively.

Item 20 describes the objective optical element wherein, in the invention describes in item 19, the following expressions (1), (2), and (3) are satisfied.

$$-0.02 < m1 < 0.02 \quad (1)$$

$$-0.02 < m2 < 0.02 \quad (2)$$

$$-0.02 < m3 < 0.02 \quad (3)$$

Item 21 describes the objective optical element wherein, the invention described in any one of item 18 to 20, the following relationships are satisfied.

$$a=3, b=2, c=2 \text{ or } 1$$

$$x=2, y=1, z=1$$

Item 22 describes the objective optical element wherein, the invention described in any one of items 18 to 20, the following relationships are satisfied.

$$a=1, b=1, c=1$$

$$x=2, y=1, z=1$$

Item 23 describes the objective optical element wherein, in the invention described in any one of items 18 to 22, an average pitch of a structure formed by the first central basic structure and the second central basic structure overlapped with each other, is larger than an average pitch of a structure formed by the first peripheral basic structure and the second peripheral basic structure overlapped with each other.

Item 24 describes an objective optical element for use in an optical pickup device which forms a converged spot on an information recording surface of a first optical information recording medium including a protective layer with a thickness of t1, by using a first light flux with a wavelength of λ1 emitted from a first light source, forms a converged spot on an information recording surface of a second optical information recording medium including a protective layer with a thickness of t2 (t1≦t2), by using a second light flux with a wavelength of λ2 (λ1<λ2) emitted from a second light source, and forms a converged spot on an information recording surface of a third optical information recording medium including a protective layer with a thickness of t3 (t2<t3), by using a third light flux with a wavelength of λ3 (1.9×λ1<λ3<2.1×λ1) emitted from a third light source. The objective optical element is a single lens, and comprises an optical functional surface including at least two areas of a central area including an optical axis and a peripheral area surrounding the central area. The central area is used for forming the converged spot on each of the information recording surfaces of the first optical information recording medium, the second optical information recording medium, and the third optical information recording medium, and the peripheral area is used for forming the converged spot on only the information recording surfaces of the first optical information recording medium and the second optical information recording medium out of the first optical information recording medium, the second optical information recording medium and the third optical information recording medium. Each of the central area and the peripheral area comprises a structure in a shape of ring-shaped zones divided with step differences, and step differences between adjoining ring-shaped zones in the central area and/or the peripheral area have at least two types of length along an optical axis out of d1 (μm), d2 (μm), and d3 (μm) satisfying the expressions (4), (5), and (6) respectively.

$$1.6 < |d1[1-n\cdot\cos\{\theta-\arcsin(\sin\theta/n)\}]/\lambda 1| < 2.4 \quad (4)$$

$$2.6 < |d2[1-n\cdot\cos\{\theta-\arcsin(\sin\theta/n)\}]/\lambda 1| < 3.4 \quad (5)$$

$$4.6 < |d3[1-n\cdot\cos\{\theta-\arcsin(\sin\theta/n)\}]/\lambda 1| < 5.4 \quad (6)$$

In these expressions, n is a refractive index of the objective lens for a light flux with the wavelength $\lambda 1$ (μm), and $\theta$ is a surface angle of a base aspheric surface of an optical surface of the objective lens, at the step difference.

Item 25 describes the objective optical element wherein, the invention described in item 24, the step differences of the ring-shaped zones have at least two types of length along the optical axis out of d1 (μm), d2 (μm), and d3 (μm) satisfying the expressions (4'), (5'), and (6') respectively.

$$1.8 < |d1[1-n\cdot\cos\{\theta-\arcsin(\sin\theta/n)\}]/\lambda 1| < 2.2 \quad (4')$$

$$2.9 < |d2[1-n\cdot\cos\{\theta-\arcsin(\sin\theta/n)\}]/\lambda 1| < 3.3 \quad (5')$$

$$4.8 < |d3[1-n\cdot\cos\{\theta-\arcsin(\sin\theta/n)\}]/\lambda 1| < 5.2 \quad (6')$$

Item 26 describes an objective optical element for use in an optical pickup device which forms a converged spot on an information recording surface of a first optical information recording medium including a protective layer with a thickness of t1, by using a first light flux with a wavelength of $\lambda 1$ emitted from a first light source, forms a converged spot on an information recording surface of a second optical information recording medium including a protective layer with a thickness of t2 (t1≦t2), by using a second light flux with a wavelength of $\lambda 2$ ($\lambda 1 < \lambda 2$) emitted from a second light source, and forms a converged spot on an information recording surface of a third optical information recording medium including a protective layer with a thickness of t3 (t2<t3), by using a third light flux with a wavelength of $\lambda 3$ (1.9×$\lambda 1$<$\lambda 3$<2.1×$\lambda 1$) emitted from a third light source. The objective optical element is a single lens, and comprises an optical functional surface including at least two areas of a central area including an optical axis and a peripheral area surrounding the central area. The central area is used for forming the converged spot on each of the information recording surfaces of the first optical information recording medium, the second optical information recording medium, and the third optical information recording medium, and the peripheral area is used for forming the converged spot on only the information recording surfaces of the first optical information recording medium and the second optical information recording medium out of the first optical information recording medium, the second optical information recording medium and the third optical information recording medium. Each of the central area and the peripheral area comprises a structure in a shape of ring-shaped zones divided with step differences, and step differences between adjoining ring-shaped zones in the central area and/or the peripheral area have at least two types of length along an optical axis out of d1 (μm), d2 (μm), and d3 (μm) satisfying the expressions (7), (8), and (9) respectively.

$$0.7 < |d1[1-n\cdot\cos\{\theta-\arcsin(\sin\theta/n)\}]/\lambda 1| < 1.5 \quad (7)$$

$$1.6 < |d2[1-n\cdot\cos\{\theta-\arcsin(\sin\theta/n)\}]/\lambda 1| < 2.4 \quad (8)$$

$$2.6 < |d3[1-n\cdot\cos\{\theta-\arcsin(\sin\theta/n)\}]/\lambda 1| < 3.4 \quad (9)$$

In the expressions, n is a refractive index of the objective lens for a light flux with the wavelength $\lambda 1$ (μm), and $\theta$ is a surface angle of a base aspheric surface of an optical surface of the objective lens, at the step difference.

Item 27 describes the objective optical element wherein, the invention described in item 26, the step differences of the ring-shaped zones have at least two types of length along the optical axis out of d1 (μm), d2 (μm), and d3 (μm) satisfying the expressions (7'), (8'), and (9') respectively.

$$0.9 < |d1[1-n\cdot\cos\{\theta-\arcsin(\sin\theta/n)\}]/\lambda 1| < 1.3 \quad (7')$$

$$1.8 < |d2[1-n\cdot\cos\{\theta-\arcsin(\sin\theta/n)\}]/\lambda 1| < 2.2 \quad (8')$$

$$2.8 < |d3[1-n\cdot\cos\{\theta-\arcsin(\sin\theta/n)\}]/\lambda 1| < 3.2 \quad (9')$$

Item 28 describes the objective optical element wherein, the invention described in any one of items 18 to 27, an optical surface on which the ring-shaped zones are formed faces a light-source side.

Item 29 describes the objective optical element, in the invention described in any one of items 18 to 28, further comprising a most peripheral area surrounding the peripheral area, wherein the most peripheral area is used for forming a converged spot only on the information recording surface of the second optical information recording medium.

Item 30 describes the objective optical element, in the invention described in any one of items 18 to 28, further comprising a most peripheral area surrounding the peripheral area, wherein the most peripheral area is used for forming a converged spot only on the information recording surface of the first optical information recording medium.

Item 31 describes the objective optical element, wherein, in the invention described in any one of items 18 to 30, each of the first central basic structure, the second central basic structure, the first peripheral basic structure, and the second peripheral basic structure is a diffractive structure in a serrated shape.

Item 32 describes the objective optical element wherein, in the invention described in any one of items 18 to 31, the thickness t1 of the protective layer of the first optical information recording medium satisfies 0.5 mm≦t1≦0.7 mm, the thickness t2 of the protective layer of the second optical information recording medium satisfies 0.5 mm≦t2≦0.7 mm, and the thickness t3 of the protective layer of the third optical information recording medium satisfies 1.1 mm≦t3≦1.3 mm.

Item 33 describes the objective optical element wherein, in the invention described in any one of items 18 to 31, the thickness t1 of the protective layer of the first optical information recording medium satisfies 0.0750 mm≦t1≦0.1125 mm, the thickness t2 of the protective layer of the second optical information recording medium satisfies 0.5 mm≦t2≦0.7 mm, and the thickness t3 of the protective layer of the third optical information recording medium satisfies 1.1 mm≦t3≦1.3 mm.

Item 34 describes the objective optical element wherein, the invention described in any one of items 18 to 33, the objective optical element comprises a glass material.

Item 35 describes the objective optical element wherein, in the invention described in any one of items 18 to 33, the objective optical element comprises a plastic material.

The optical pickup device of the present invention includes the first light source, the second light source and the third light source. Further, the optical pickup device of the present invention includes a light-converging optical system including an objective optical element that converges the first light flux emitted from the first light source on an information recording surface of the first optical disc (that is called also an optical information recording medium, the same follows), converges the second light flux emitted from the second light source on an information recording surface of the second optical disc, and converges the third light flux emitted from the third light source on an information recording surface of the third optical disc.

The first optical disc includes a protective layer with a thickness of t1 and an information recording surface. The second optical disc includes a protective layer with a thickness t2 (t1≦t2) and an information recording surface. The third optical disc includes a protective layer with a thickness of t3 (t2<t3) and an information recording surface. It is preferable that the first optical disc is a high density optical disc and the second optical disc is DVD, and it is preferable that the third optical disc is CD, which, however, does not always need to be followed. In particular, it is preferable that the first optical disc is BD or HD. Further, the first optical disc, the second optical disc or the third optical disc may also be a multi-layer optical disc including plural information recording surfaces.

In the present specification, there is given, as an example of a high density optical disc, an optical disc under the standard that information is recorded and/or reproduced thereon by an objective optical element with NA 0.85, and a thickness of a protective layer is about 0.1 mm (for example, BD: Blu-ray disc). Further, as an example of another high density optical disc, there is given an optical disc under the standard that information is recorded and/or reproduced by an objective optical element with NA 0.65 to 0.67, and a thickness of a protective layer is about 0.6 mm (for example, HD DVD which is simply called also HD). Further, the high density optical disc includes an optical disc having a protective layer with a thickness of about several nm-several tens nm on an information recording surface (a protective substrate includes a protective film, in the present specification) and an optical disc wherein a thickness of a protective substrate is 0. Further, the high density optical disc is defined to include a photomagnetic disc for which a violet semiconductor laser or a violet SGH laser is used. In addition, in the present specification, DVD means a general term for optical discs in DVD group wherein information is recorded and/or reproduced by an objective optical element with NA of about 0.60 to 0.67, and a thickness of a protective substrate is about 0.6 mm, and it includes DVD-ROM, DVD-Video, DVD-Audio, DVD-RAM, DVD-R, DVD-RW, DVD+R and DVD+RW. Further, in the present specification, CD means a general term for optical discs in CD group wherein information is recorded and/or reproduced by an objective optical element with NA of about 0.45 to 0.51, and a thickness of a protective substrate is about 1.2 mm, and it includes CD-ROM, CD-Audio, CD-Video, CD-R and CD-RW. In the meantime, with respect to recording density, recording density of the high density optical disc is highest, and it goes down in the order of DVD and CD.

Meanwhile, with respect to thicknesses t1, t2 and t3 of protective substrates, it is preferable they satisfy respectively the following conditional expressions (10), (11) and (12), to which, however, the invention is not limited.

$$0.0750 \text{ mm} \leq t1 \leq 0.1125 \text{ mm or } 0.5 \text{ mm} \leq t1 \leq 0.7 \text{ mm} \quad (10)$$

$$0.5 \text{ mm} \leq t2 \leq 0.7 \text{ mm} \quad (11)$$

$$0.9 \text{ mm} \leq t3 \leq 1.3 \text{ mm} \quad (12)$$

It is defined that NA1 represents a numerical aperture on the image side of an objective optical element necessary for reproducing and/or recording information for the first optical disc, NA2 (NA1≧NA2) represents a numerical aperture on the image side of the objective optical element necessary for reproducing and/or recording information for the second optical disc and NA3 (NA2≧NA3) represents a numerical aperture on the image side of the objective optical element necessary for reproducing and/or recording information for the third optical disc. It is preferable that NA1 is 0.8 or more and is 0.9 or less, or it is 0.55 or more and is 0.7 or less. It is preferable that NA2 is 0.55 or more and is 0.7 or less. Further, it is preferable that NA3 is 0.4 or more and is 0.55 or less.

The first light source emits a first light flux with wavelength $\lambda 1$. The second light source emits a second light flux with wavelength $\lambda 2$ ($\lambda 1 < \lambda 2$). When the third light source is employed, the third light source emits a third light flux with wavelength $\lambda 3$ ($\lambda 2 < \lambda 3$). In the present specification, each of the first and second light sources is preferably a laser light source. When the third light source is employed, the light source may also be a laser light source. As a laser light source, a semiconductor laser, a silicon laser and an SHG laser can be used preferably. Meanwhile, it is preferable that $\lambda 1$ and $\lambda 2$ satisfy the following conditional expression (13). Further, when the third light source is employed, it is preferable that $\lambda 3$ satisfies the following conditional expression (14).

$$1.5 \times \lambda 1 (nm) < \lambda 2 < 1.7 \times \lambda 1 (nm) \quad (13)$$

$$1.9 \times \lambda 1 (nm) < \lambda 3 < 2.1 \times \lambda 1 (nm) \quad (14)$$

When BD or HD, DVD and CD are used as the first optical disc, the second optical disc and the third optical disc, respectively, the first wavelength $\lambda 1$ of the first light source is preferably 350 nm or more and is 440 nm or less, and is more preferably 380 nm or more and is 415 nm or less, and the second wavelength $\lambda 2$ of the second light source is preferably 570 nm or more and is 680 nm or less, and is more preferably 630 nm or more and is 670 mm or less. Further, when CD is employed as the third optical disc, the third wavelength $\lambda 3$ of the third light source is preferably 750 nm or more and is 880 nm or less, and is more preferably 760 nm or more and is 820 nm or less.

Further, the first light source and the second light source may be unitized. When the third light source is employed, it is possible to add the third light source to the first and second light sources to be unitized. Unitization means that the first light source and the second light source, for example, are fixed and housed in one package, and it also widely includes, without being limited to the foregoing, the state wherein two light sources are fixed such that aberrations is unable to be corrected. It is further possible to add a light-receiving element which will be explained later to the light sources to be one package.

As the light-receiving element, a photodetector such as a photodiode is used preferably. A light flux reflected on an information recording surface of an optical disc enters the light-receiving element, and output signal generated by the light flux thus entered are used to obtain reading signal of information recorded on the optical disc. Furthermore, changes in an amount of the light flux caused by form changes and position changes of a spot on the light-receiving element are detected to conduct focusing detection and track detection. Thereby, it is possible to move an objective optical element for the purpose of focusing and tracking, based on the aforesaid detections. The light-receiving element may also be composed of a plurality of photodetectors. The light-receiving element may also include a main photodetector and a substitute photodetector. For example, it is possible to provide a light-receiving element wherein two substitute photodetectors are arranged on both sides of a photodetector that receives main rays used for information recording and reproducing, and the aforesaid two substitute photodetectors receive substitute rays for tracking adjustment. Further, the light-receiving element may have plural light-receiving sections which correspond respectively to light sources.

A light-converging optical system (or an objective optical system which will be explained later) enables to conduct information recording and/or information reproducing by converging the first light flux on an information recording surface of the first optical disc through a protective substrate having a thickness of t1, then, it enables to conduct information recording and/or information reproducing by converging the second light flux on an information recording surface of the second optical disc through a protective substrate having a thickness of t2, and it enables to conduct information recording and/or information reproducing by converging the third light flux on an information recording surface of the third optical disc through a protective substrate having a thickness of t3.

The light-converging optical system of the optical pickup device may include only an objective optical element. Alternatively, it may further include a coupling lens such as a collimating lens, in addition to the objective optical element. The coupling lens means a single lens or a lens group that is arranged between the objective optical element and a light source, and changes a divergent angle of a light flux. Further, the light-converging optical system may also include an optical element such as a diffractive optical element that divides a light flux emitted from a light source into a main light flux used for information recording and reproducing and two substitute light fluxes used for a tracking operation. In the present specification, the objective optical element means an optical element that is arranged at the position to face an optical disc under the condition that an optical disc is loaded on the optical pickup device, and that has a function to converge a light flux emitted from a light source on an information recording surface of an optical disc.

When the objective optical element is made of plastics, any kind of plastic that is generally used as an optical material can be used, and preferable one is a cyclic olefin-based resin material. Further, it is more preferable to use resin materials wherein a refractive index at 25° C. for wavelength 405 nm is within a range from 1.54 to 1.60, and rate of change dN/dT (° C.-1) in refractive index for wavelength 405 nm caused by a temperature change within a range of temperature from −5° C. to 70° C. is within a range from $-20 \times 10^{-5}$ to $-5 \times 10^{-5}$ (a range from $-10 \times 10^{-5}$ to $-8 \times 10^{-5}$ is more preferable). When an objective optical element is made of plastic, it is preferable that a coupling lens is also made of plastic. Alternatively, the objective optical element may be made of glass.

The objective optical element is a single lens, and an optical functional surface of the objective optical element includes at least two areas of a central area including an optical axis and a peripheral area surrounding the central area. The optical functional surface may further include a most peripheral area surrounding the peripheral area. It is preferable that the central area, the peripheral area and the most peripheral area are provided on the same optical functional surface in a form of concentric circles whose centers are on the same optical axis.

The central area is used for forming a converged spot for all information recording surfaces of the first, second and third optical discs. Namely, the first light flux having passed through the central area forms an excellent converged spot on an information recording surface of the first optical disc, the second light flux having passed through the central area forms an excellent converged spot on an information recording surface of the second optical disc, and the third light flux having passed through the central area forms an excellent converged spot on an information recording surface of the third optical disc.

The peripheral area is used for forming a converged spot only for information recording surfaces of the first and second optical discs. Namely, the first light flux having passed through the peripheral area forms an excellent converged spot on an information recording surface of the first optical disc and the second light flux having passed through the peripheral area forms an excellent converged spot on an information recording surface of the second optical disc. While, the third light flux having passed through the peripheral area becomes a flare on an information recording surface of the third optical disc, and is not used for recording and reproducing information.

When the first optical disc is HD, it is preferable that the most peripheral area is used for forming a converged spot only on an image forming surface of the second optical disc. Namely, it is preferable that the first light flux having passed through the most peripheral area becomes a flare on an image recording surface of the first optical disc and is not used for information recording and reproducing, the second light flux having passed through the most peripheral area forms an excellent converged spot on an information recording surface of the second optical disc, and the third light flux having passed through the most peripheral area becomes a flare on an information recording surface of the third optical disc and is not used for recording and reproducing information.

On the other hand, when the first optical disc is BD, it is preferable that the most peripheral area is used for forming a converged spot only on an information recording surface of the first optical disc. Namely, it is preferable that the first light flux having passed through the most peripheral area forms an excellent converged spot on an information recording surface of the first optical disc, the second light flux having passed through the most peripheral area becomes a flare on an image recording surface of the second optical disc and is not used for information recording and reproducing, and the third light flux having passed through the most peripheral area becomes a flare on an image recording surface of the third optical disc and is not used for information recording and reproducing.

Each of the central area and the peripheral area includes an optical path difference providing structure having a structure in a shape of ring-shaped zones divided by step differences. The optical path difference providing structure mentioned in the present specification is a generic term for the structures that add an optical path difference to an incident light flux. In general, the optical path difference providing structure includes also a phase difference providing structure that adds a phase difference. Further, the phase difference providing structure includes a diffractive structure. It is preferable that the optical path difference providing structure is a diffractive structure. The optical path difference providing structure has a step difference and it preferably has a plurality of step differences. The step difference or step differences adds an optical path difference and/or a phase difference to an incident light flux.

The present invention is provided to record and/or reproduce information properly, by new combinations of the optical path difference providing structures, even when magnifications are made to be almost the same for three different optical information recording media. Namely, for improving a defective optical path difference providing structure such as a diffractive structure which has been used, the present invention uses other optical path difference providing structures to conduct further corrections for solving the problems in the past.

First, an aberration is corrected by a combination of two optical path difference providing structures, because only a basic aspheric surface in the optical functional surface of the objective optical element hardly forms an aberration-free converged spot for any of optical information recording media.

The optical path difference providing structure in the central area is a structure in which the first central basic structure and the second central basic structure are overlapped with each other. The first central basic structure is a structure in a shape of ring-shaped zones divided by step differences. In the structure, light intensity of an a-th order diffracted light flux is higher than those of other order diffracted light fluxes when the first light flux has passed through the structure. Further, light intensity of a b-th order diffracted light flux is higher than those of other order diffracted light fluxes when the second light flux has passed through the structure, and light intensity of a c-th order diffracted light flux is higher than those of other order diffracted light fluxes when the third light flux has passed through the structure. Incidentally, the value of "a" is an odd number. Preferably, "a" represents any one of 1, 3 and 5. Next, the second central basic structure is a structure in a shape of ring-shaped zones divided by step differences. In the structure, light intensity of a x-th order diffracted light flux is higher than those of other order diffracted light fluxes when the first light flux has passed through the structure. Further, light intensity of a y-th order diffracted light flux is higher than those of other order diffracted light fluxes when the second light flux has passed through the structure, and light intensity of a z-th order diffracted light flux is higher than those of other order diffracted light fluxes when the third light flux has passed through the structure. Incidentally, the value of "x" is an even number. Preferably, "x" represents any one of 2, 4 and 6.

The first central basic structure is designed to correct aberrations properly for the first and third light fluxes which are refracted by the base aspheric surface. Further, when the third wavelength is close to a multiple of an even number of the first wavelength, the first central basic structure is designed to provide an optical path difference equivalent to a multiple of an odd number of wavelength λ1 to the first light flux that has passed through adjoining ring-shaped zones, for the purpose of making an action for the first light flux to be different from an action for the third light flux. In that case, the third light flux is given an optical path difference shifted by half-wavelength based on a wavelength difference, which makes an optical action for the first light flux to be different from that for the third light flux. Thus, it is possible to properly correct each aberration caused by different thicknesses of protective layers.

However, when the first central basic structure is designed as stated above, there is a fear that excellent converged spot formation is impossible for the second light flux in a combination of refractive power owned by an objective optical element itself and the first central basic structure. Therefore, it is necessary to distribute a function to cancel such excess or shortage to the second central basic structure so that information recording and/or information reproducing can be conducted properly for any optical information recording media.

As for the second central basic structure, it is possible to give an optical path difference equivalent to a multiple of an even number of wavelength λ1 to the first light flux that has passed through adjoining ring-shaped zones, and thereby to avoid that a phase of a wavefront is changed in the first light flux. Further, when the wavelength of the third light flux is about a multiple of an even number of the wavelength of the first light flux, the third light flux is given an optical path difference of a multiple of an integer, and a phase of a wavefront is not changed similarly. By doing this, each of the first, second and third light fluxes can form an excellent converged spot on each optical information recording medium, by a combination of three effects including a refractive effect of the objective optical element, an effect of the first central basic structure and an effect of the second central basic structure. Incidentally, "equivalent to a multiple of an even number" means a range which is $(2n-0.1)\times\lambda1$ or more and is $(2n+0.1)\times\lambda1$ or less, where n represents a natural number. Further, "equivalent to a multiple of an odd number" means a range which is $\{(2n-1)-0.1\}\times\lambda1$ or more and is $\{(2n-1)+0.1\}\times\lambda1$ or less, where n represents a natural number.

Next, the optical path difference providing structure of the peripheral area is a structure in which the first peripheral basic structure and the second peripheral basic structure are overlapped with each other. The first peripheral basic structure is a structure in a shape of ring-shaped zones divided by step differences. In the structure, light intensity of an a-th order diffracted light flux is higher than those of other order diffracted light fluxes when the first light flux has passed through the structure. Further, light intensity of a b-th order diffracted light flux is higher than those of other order diffracted light fluxes when the second light flux has passed through the structure. Incidentally, "a" and "b" in the first central basic structure are the same as "a" and "b" in the first peripheral basic structure in terms of a value. Further, the second peripheral basic structure is a structure in a shape of ring-shaped zones divided by step differences. In the structure, light intensity of a x-th order diffracted light flux is higher than those of other order diffracted light fluxes when the first light flux has passed through the structure. Further, light intensity of a y-th order diffracted light flux is higher than those of other order diffracted light fluxes when the second light flux has passed through the structure. Incidentally, "x" and "y" in the second central basic structure are the same as "x" and "y" in the second peripheral basic structure in terms of a value.

By making "a" and "b" in the central area to be the same as "a" and "b" in the peripheral area in terms of a value and by making "x" and "y" in the central area to be the same as "x" and "y" in the peripheral area in terms of a value, it is possible to prevent a phase shift caused on the boundary between the central area and the peripheral area in the case of recording and reproducing information for the first optical disc and the second optical disc. Thereby it prevents the higher order aberration from being caused. If this higher order aberration is caused inconveniently, it is hardly corrected only by changing a magnification. Therefore it is hardly corrected only by moving the objective lens and a collimator in the optical axis direction. Therefore, an apparatus such as a liquid crystal is needed for correcting the higher order aberration, which results in complicated structure for pickup and in cost increase. By preventing occurrence of the higher order aberration, the structure of the optical pickup device can be simplified, and the cost can be reduced.

The first peripheral basic structure provides an optical path difference equivalent to a multiple of an odd number of wavelength λ1 to the first light flux that has passed through adjoining ring-shaped zones. Further, the second peripheral basic structure provides an optical path difference equivalent to a multiple of an even number of wavelength λ1 to the first light flux that has passed through adjoining ring-shaped zones.

A preferable example for values of a, b, c, x, y and z includes a=3, b=2, c=2 or 1, x=2, y=1 and z=1.

When the aforesaid values are satisfied, it is preferable that step differences between adjoining ring-shaped zones in the central area and the peripheral area have at least two types of length in the optical axis direction among d1 (μm), d2 (μm) and d3 (μm) which respectively satisfy expressions (4), (5) and (6).

$$1.6 < |d1[1 - n \cdot \cos\{\theta - \arcsin(\sin\theta/n)\}]/\lambda 1| < 2.4 \quad (4)$$

$$2.6 < |d2[1 - n \cdot \cos\{\theta - \arcsin(\sin\theta/n)\}]/\lambda 1| < 3.4 \quad (5)$$

$$4.6 < |d3[1 - n \cdot \cos\{\theta - \arcsin(\sin\theta/n)\}]/\lambda 1| < 5.4 \quad (6)$$

In these expressions, n represents a refractive index of the objective lens for the light flux with wavelength λ1 (μm), and θ represents a surface angle of the basic aspheric surface at a step difference on the optical surface of the objective lens.

The surface angle of the basic aspheric surface means, as shown in FIG. 4, an angle (illustrated as θ) formed by a normal on a tangent of the basic aspheric surface (enveloping surface shown with a solid line, connecting vertexes of step differences) at the position where a step difference shown with broken lines exists and by the optical axis.

It is more preferable that they have at least two types of a length in the optical axis direction among d1 (μm), d2 (μm) and d3 (μm) which respectively satisfy the following expressions (4'), (5') and (6').

$$1.8 < |d1[1 - n \cdot \cos\{\theta - \arcsin(\sin\theta/n)\}]/\lambda 1| < 2.2 \quad (4')$$

$$2.9 < |d2[1 - n \cdot \cos\{\theta - \arcsin(\sin\theta/n)\}]/\lambda 1| < 3.3 \quad (5')$$

$$4.8 < |d3[1 - n \cdot \cos\{\theta - \arcsin(\sin\theta/n)\}]/\lambda 1| < 5.2 \quad (6')$$

A preferable another example of values a, b, c, x, y and z includes a=1, b=1, c=1, x=2, y=1 and z=1.

When the aforesaid values are satisfied, it is preferable that step differences between adjoining ring-shaped zones in the central area and the peripheral area have at least two types of length in the optical axis direction among d1 (μm), d2 (μm) and d3 (μm) which respectively satisfy expressions (7), (8) and (9).

$$0.7 < |d1[1 - n \cdot \cos\{\theta - \arcsin(\sin\theta/n)\}]/\lambda 1| < 1.5 \quad (7)$$

$$1.6 < |d2[1 - n \cdot \cos\{\theta - \arcsin(\sin\theta/n)\}]/\lambda 1| < 2.4 \quad (8)$$

$$2.6 < |d3[1 - n \cdot \cos\{\theta - \arcsin(\sin\theta/n)\}]/\lambda 1| < 3.4 \quad (9)$$

It is more preferable to have at least two types of a length in the optical axis direction among d1 (μm), d2 (μm) and d3 (μm) which respectively satisfy the following expressions (7'), (8') and (9').

$$0.9 < |d1[1 - n \cdot \cos\{\theta - \arcsin(\sin\theta/n)\}]/\lambda 1| < 1.3 \quad (7')$$

$$1.8 < |d2[1 - n \cdot \cos\{\theta - \arcsin(\sin\theta/n)\}]/\lambda 1| < 2.2 \quad (8')$$

$$2.8 < |d3[1 - n \cdot \cos\{\theta - \arcsin(\sin\theta/n)\}]/\lambda 1| < 3.2 \quad (9')$$

Further, "a" and "b" in the central area are the same as "a" and "b" in the peripheral area in terms of a value, and "x" and "y" in the central area are the same as "x" and "y" in the peripheral area in terms of a value. The total power that is the sum of refraction power in the central area and diffracting power in the first and second central areas and the total power that is the sum of refraction power in the peripheral area and diffracting power in the first and second peripheral areas are the same for the first light flux and the second light flux. However, a balance of respective diffracting powers is changed between the first and second central basic structures, and between the first and second peripheral basic structures. Thereby, it enables to make the third light flux having passed through the peripheral area to be a flare on an information recording surface of the third optical disc. The power mentioned in this case means a force to deflect a light flux and a wavefront. It is preferable that a power of the central area is smaller than that of the peripheral area. It is therefore preferable that an average pitch of the structure where the first central basic structure and the second central basic structure are overlapped with each other in the central area is greater than that of the structure where the first peripheral basic structure and the second peripheral basic structure are overlapped with each other. Meanwhile, with respect to the average pitch, an average pitch in the central area is indicated by h1/M1, and an average pitch in the peripheral area is indicated by h2/M2. M1 is the total number of ring-shaped zones of the structure where the first central basic structure and the second central basic structure are overlapped with each other in the central area, and M2 is the total number of the ring-shaped zones of the structure where the first peripheral basic structure and the second peripheral basic structure are overlapped with each other in the peripheral area. The symbol h1 represents a height of the outermost circumference of the central area from the optical axis in the direction perpendicular to the optical axis, and h2 represents a distance in the direction perpendicular to the optical axis between the innermost circumference and the outermost circumference of the peripheral area.

It is preferable that a size of a pitch of the ring-shaped zone on the outermost side in the central area is smaller than that of a pitch of the ring-shaped zone on the innermost side in the peripheral area. Owing to the structure of this kind, it is possible to form a flare at a farther position, and to surely prevent recording and reproducing operation from being affected by unwanted light. Meanwhile, the pitch mentioned here means a length (width) of a ring-shaped zone in the direction perpendicular to the optical axis.

It is preferable that values of "a" and "b" in the first central basic structure are the same as those in the first peripheral basic structure, and the order of the diffracted light flux generated in the first light flux is the same as that of the diffracted light flux generated in the second light flux, nevertheless, a role of the first central basic structure is different from that of the first peripheral basic structure. Specifically, it is preferable that the first central basic structure achieves compatibility for the third optical information recording medium by using the c-th order diffracted light of the third light flux. In contrast to this, it is preferable that the first peripheral basic structure prevents a phase shift in wavelength characteristics, in particular, a phase shift caused when the second optical information recording medium is used.

It is further preferable that the most peripheral area also includes the optical path difference providing structure. It is preferable that the optical path difference providing structure of the most peripheral area is composed only of a first most peripheral basic structure. The first most peripheral basic structure is a structure in a shape of ring-shaped zones divided by step differences. In the structure, a light intensity of a d-th order diffracted light flux is higher than those of other order diffracted light fluxes when the second light flux passes through the first most peripheral basic structure. An arbitral integer can be selected for "d". Alternatively, the most peripheral area may be a refractive surface.

Each of the first central basic structure, the second central basic structure, the first peripheral basic structure and the second peripheral basic structure is a serrated diffractive structure, and it is preferable, as a result, that each of the optical path difference providing structure of a central area and the optical path difference providing structure of a peripheral area is a serrated diffractive structure. The serrated diffractive structure is a structure wherein all the step difference surfaces in the structure in the shape of ring-shaped zones are oriented in the same direction (the direction toward the optical axis in FIG. 2C) as shown in FIGS. 2A, 2B and 2C. Incidentally, Δ in FIG. 2C represents a length of the step difference in the optical axis direction.

It is preferable that each of the optical path difference providing structure in the central area and the optical path difference providing structure in the peripheral area is not a turning structure. The turning structure is a structure shown in FIGS. 3A and 3B, and in this example, a direction of step differences differ between an area on the optical axis side and the other area on the effective aperture side, where these areas are positioned at the both side of a boundary of ring-shaped zone STO. In another expression, it can also be said that the step differences are provided so that their depth increases up to a certain height in the direction perpendicular to the optical axis, and are provided so that their depth decreases at a position that is away from the prescribed height.

It is preferable that each of the optical path difference providing structure on the central area and the optical path difference providing structure on the peripheral area is provided on an optical functional surface of the objective optical element on the light source side (generally, an optical functional surface with a greater curvature).

Magnifications m1, m2 and m3 respectively for the first fight flux, the second light flux, and the third light flux entering the objective optical element are almost the same each other. The situation that m1, m2 and m3 are mostly the same means that an absolute value of a difference between two values is 0.01 or less.

Further, if magnifications m1, m2 and m3 respectively for the first fight flux, the second light flux, and the third light flux entering the objective optical element, satisfy the following relational expressions (1), (2) and (3) respectively, infinite parallel light or nearly infinite parallel light can enter the objective optical element, and occurrence of coma can be controlled during tracking operations of the objective optical element. Thus, handling of the optical pickup device is easy and an information recording and reproducing device as a writing system and as a high speed type can use it favorably.

$$-0.02 < m1 < 0.02 \quad (1)$$

$$-0.02 < m2 < 0.02 \quad (2)$$

$$-0.02 < m3 < 0.02 \quad (3)$$

An optical information recording and reproducing apparatus relating to the present invention includes an optical disc drive device including the aforesaid optical pickup device. Now, an optical disc drive device to be mounted on the optical information recording and reproducing apparatus will be explained. An optical disc drive device is classified in systems to eject only a tray that can support an optical disc under the condition that the optical disc is loaded thereon from an optical information recording and reproducing apparatus main body that houses an optical pickup device, and systems to eject a main body of an optical disc drive device that houses an optical pickup device.

An optical information recording and reproducing apparatus employing each system stated above is usually equipped with the following constituent members, to which, however, the invention is not limited. The constituent members include an optical pickup device housed in a housing, a drive source for an optical pickup device such as a seek motor that moves an optical pickup device toward an internal circumference or an outer circumference of an optical disc together with the housing, a device of transportation for an optical pickup device having a guide rail that guides the housing of the optical pickup device toward an internal circumference or an outer circumference of an optical disc, and a spindle motor that drives an optical disc to rotate.

In the former system, there are provided a tray that can support an optical disc under the condition that the optical disc is loaded thereon and a loading mechanism that slidably move the tray, in addition to the aforesaid constituent members. In the latter system, it is preferable that neither tray nor loading mechanism is provided, and each constituent member is provided on a drawer corresponding to a chassis that makes it possible to draw respective constituent members outside.

ADVANTAGEOUS EFFECTS OF INVENTION

The present invention provides an optical pickup device that can conduct information recording and/or information reproducing properly despite its compactness, for high density optical discs each being different in terms of a type.

Figure 2A:
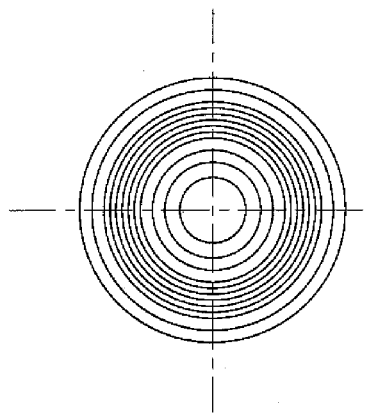
Figures 2B, 2C:
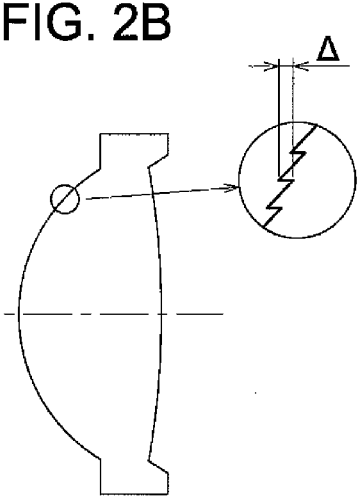

Each of FIGS. 2A, 2B and 2C is a schematic diagram showing an objective lens having a structure in a shape of serrated ring-shaped zones.

Figures 3A, 3B:
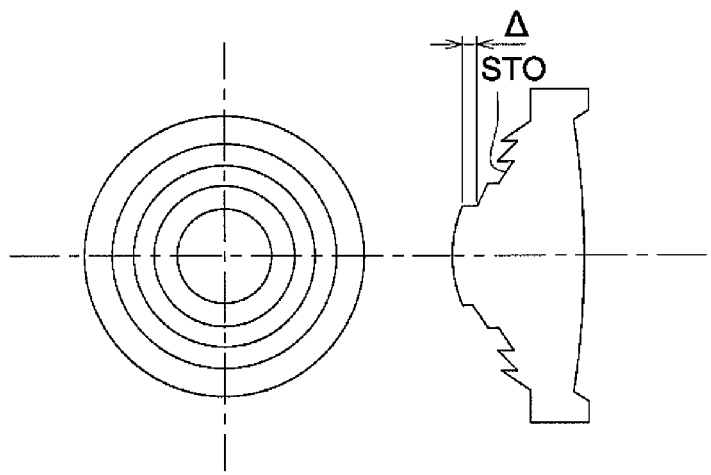

Each of FIGS. 3A and 3B is a schematic diagram showing objective optical element 4 in the present embodiment.

Figure 4:
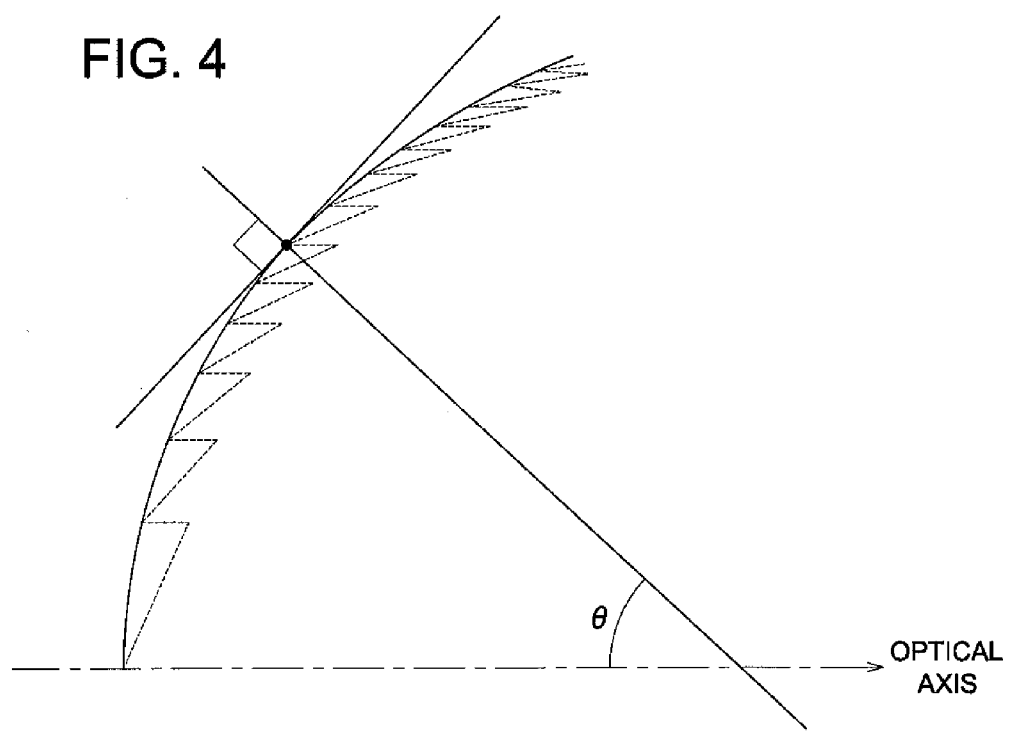

FIG. 4 is an illustrating diagram for illustrating a surface angle of a basic aspheric surface.

| REFERENCE SIGNS LIST | |
|---|---|
| AC: | Biaxial actuator |
| PPS: | Dichroic prism |
| CL: | Collimating lens |
| LD1: | Violet semiconductor laser |
| LM: | Laser module |
| OBJ: | Objective optical element |
| PL1: | Protective layer |
| PL2: | Protective layer |
| PL3: | Protective layer |
| PU1: | Optical pickup device |
| RL1: | Information recording surface |
| RL2: | Information recording surface |
| RL3: | Information recording surface |
| ST: | Diaphragm |

BEST MODE FOR CARRYING OUT THE INVENTION

Figure 1:
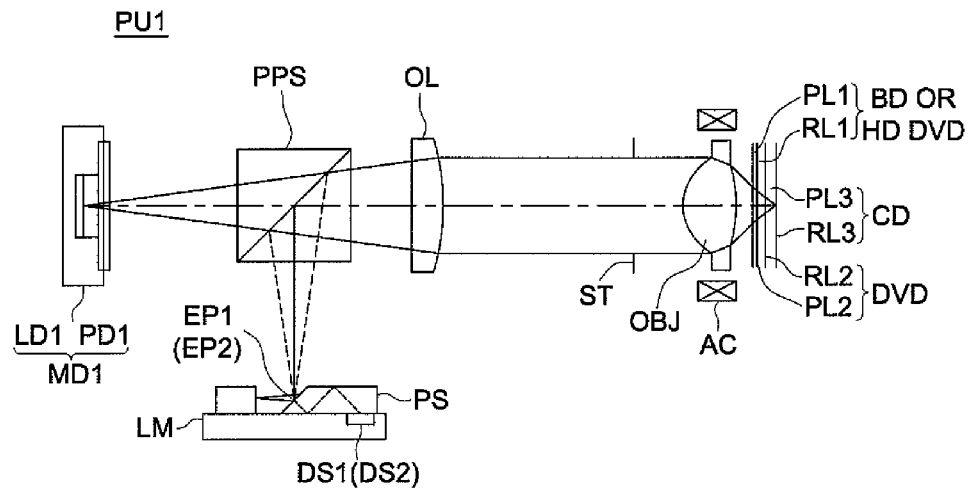
FIG. 1 is a diagram schematically showing a structure of an optical pickup device in the present embodiment.

An embodiment of the present invention will be explained as follows, referring to the drawings. FIG. 1 is a diagram schematically showing the structure of optical pickup device PU1 in the present embodiment capable of recording and reproducing information properly for HD DVD (or BD), DVD and CD which are optical information recording media (which are called also optical discs) each being different from others. The optical pickup device PU1 of this kind can be housed in an optical information recording and reproducing apparatus. In this case, HD represents the first optical information recording medium, DVD represents the second optical information recording medium and CD represents the third optical information recording medium. The embodiment is provided with laser module LM which is composed of second semiconductor laser EP1 (second light source) that emits a laser light flux (second light flux) with wavelength 680 nm when recording and reproducing information for DVD, third semiconductor laser EP2 (third light source) that emits a laser light flux (third light flux) with wavelength 750 nm when recording and reproducing information for CD, first light-receiving section DS1 that receives a light flux reflected on information recording surface RL2 of DVD, second light-receiving section DS2 that receives a light flux reflected on information recording surface RL3 of CD, and prism PS.

In objective optical element OBJ of the present embodiment, there are formed a central area including the optical axis, a peripheral area arranged on the circumference of the central area, and a most peripheral area arranged on the circumference of the peripheral area, on an aspheric optical surface on the light source side. The first central basic structure and the second central basic structure are formed on the central area to be overlapped with each other, and the first peripheral basic structure and the second peripheral basic structure are formed on the peripheral area to be overlapped with each other. In the first central basic structure whose section shows a structure in a shape of serrated ring-shaped zones, an optical path difference equivalent to a multiple of an odd number of wavelength λ1 is given to a light flux that has passed through adjoining ring-shaped zones. At the same time, light intensity of the third (or first) order diffracted light flux becomes higher than those of other order diffracted light fluxes when the first light flux has passed though the first central basic structure, then, light intensity of the second (or first) order diffracted light flux becomes higher than those of other order diffracted light fluxes when the second light flux has passed though the first central basic structure, and light intensity of the second or first (or first) order diffracted light flux becomes higher than those of other order diffracted light fluxes when the third light flux has passed though the first central basic structure. Further, in the second central basic structure, light intensity of the second order diffracted light flux becomes higher than those of other order diffracted light fluxes when the first light flux has passed through the second central basic structure, then, light intensity of the first order diffracted light flux becomes higher than those of other orders diffracted light fluxes when the second light flux has passed through the second central basic structure, and light intensity of the first order diffracted light flux becomes higher than those of other order diffracted light fluxes when the third light flux has passed through the second central basic structure.

In the first peripheral basic structure, light intensity of third (or first) order diffracted light flux becomes higher than those of other order diffracted light fluxes when the first light flux has passed through the first peripheral basic structure, and light intensity of second (or first) order diffracted light flux becomes higher than those of other order diffracted light fluxes when the second light flux has passed through the first peripheral basic structure. Further, in the second peripheral basic structure, light intensity of second order diffracted light flux becomes higher than those of other order diffracted light fluxes when the first light flux has passed through the second peripheral basic structure, and light intensity of first order diffracted light flux becomes higher than those of other orders diffracted light fluxes when the second light flux has passed through the second peripheral basic structure.

Further, an average pitch of the optical path difference providing structure that is formed by overlapping the first central basic structure and second central basic structure in the central area with each other, is greater than that of an optical path difference providing structure that is formed by overlapping the first peripheral basic structure and second peripheral basic structure in the peripheral area with each other.

In the most peripheral area, there is formed a structure in a shape of serrated ring-shaped zones. In the structure in a shape of ring-shaped zones, intensity of the third order diffracted light flux becomes higher than those of other order diffracted light fluxes when the second light flux has passed through the structure.

When a light flux with wavelength λ1 emitted from violet semiconductor laser LD1 enters objective optical element OBJ in the form of a parallel light flux, it is possible to record and/or reproduce information properly for HD including a protective layer with a thickness of t1. Further, when a light flux with wavelength λ2 emitted from red semiconductor laser EP1 enters objective optical element OBJ in the form of a parallel light flux, it is possible to record and/or reproduce information properly for DVD including a protective layer with a thickness of t2. In addition, when a light flux with wavelength λ3 emitted from infrared semiconductor laser EP2 enters objective optical element OBJ in the form of a parallel light flux, it is possible to record and/or reproduce information properly for CD including a protective layer with a thickness of t3.

A divergent light flux having the first wavelength 408 nm emitted from violet semiconductor laser LD1 passes through dichroic prism PPS, and is formed into a parallel light flux by collimating lens CL. Then, it is converted into a circularly polarized light from a linearly polarized light by an unillustrated λ/4 wavelength plate, and enters objective optical element OBJ. A light flux converged by the central area and the peripheral area of objective optical element OBJ becomes a spot formed on information recording surface RL1 through protective layer PL1 having a thickness of 0.6 mm (where a light flux having passed through the area other than the central area and the peripheral area is flared).

A reflected light flux modulated by information pits on information recording surface RL1 passes again through objective optical element OBJ, is converted into a linearly polarized light from a circularly polarized light by an unillustrated λ/4 wavelength plate, and is changed to a converged light flux by collimating lens CL. Then, after passing through dichroic prism PPS, it is converged on a light-receiving surface of first photodetector PD1. Then, output signal of first photodetector PD1 are used to conduct focusing and tracking operations for objective optical element OBJ by biaxial actuator AC, thus, information recorded on HD can be read.

A divergent light flux with wavelength 660 nm emitted from red semiconductor laser EP1 is reflected on prism PS, and further reflected by dichroic prism PPS. Then, it is converted into a parallel light flux by collimating lens CL and is converted into a circularly polarized light from a linearly polarized light by an unillustrated λ/4 wavelength plate. It is further regulated in terms of a diameter of the light flux by diaphragm ST and enters objective optical element OBJ. In the objective optical element OBJ, a light flux converged by the central area, the peripheral area and the most peripheral area of the objective optical element OBJ becomes a spot formed on information recording surface RL2 of DVD having protective layer PL2 with a thickness of 0.6 mm.

A reflected light flux modulated by information pits on information recording surface RL2 passes again through objective optical element OBJ and diaphragm ST, and then, is converted into a linearly polarized light from a circularly polarized light by an unillustrated λ/4 wavelength plate. Then, it is changed to a converged light flux by collimating lens CL and is reflected by dichroic prism PPS. After that, it is reflected twice in the prism and is converged on first light-receiving section DS1. Thus, information recorded on DVD can be read by using output signal of first light-receiving section DS1.

A divergent light flux with wavelength 785 nm emitted from infrared semiconductor laser EP2 is reflected on prism PS and is further reflected by dichroic prism PPS. Then, after being converted into a parallel light flux by collimating lens CL, it is converted into a circularly polarized light from a linearly polarized light by an unillustrated λ/4 wavelength plate, and enters objective optical element OBJ. A light flux that is converged by only the central area of objective optical element OBJ (where a light flux having passed through the area other than the central area is flared) becomes a spot formed on information recording surface RL3 of CD through a protective layer PL3 with a thickness of 1.2 mm.

A reflected light flux modulated by information pits on information recording surface RL3 passes again through objective optical element OBJ and diaphragm ST, and then, is converted into a linearly polarized light from a circularly polarized light by an unillustrated λ/4 wavelength plate. Then, it is changed to a converge light flux by collimating lens CL and is reflected by dichroic prism PPS. After that, it is reflected twice in the prism and is converged on second light-receiving section DS2. Thus, information recorded on CD can be read by using output signal of second light-receiving section DS2.

Example 1

Next, an example that can be used for the aforesaid embodiment will be explained. In Example 1, an objective optical element is provided as a single lens. On the central area of an optical surface of the objective optical element, there is formed the first optical path difference providing structure in which the first central basic structure and the second central basic structure are overlapped each other, and on the peripheral area, there is formed the second optical path difference providing structure in which the first peripheral basic structure and the second peripheral basic structure are overlapped with each other. On the most peripheral area, there is formed the first most peripheral basic structure. Lens data of the Example 1 are shown on Table 1. In Table 1, ri represents a curvature radius, di represents a displacement in the optical axial direction from i-th surface to (i+1)-th surface, and ni represents a refractive index of each surface. Meanwhile, hereinafter (including lens data in Tables), a number expressed by power of ten (for example, $2.5 \times 10^{-3}$) is indicated by using E (for example, 2.5×E−3). Further, the 2-1th surface is the central area, the 2-2th surface is the peripheral area and the 2-3th surface is the most peripheral area.

TABLE 1

| Example 1 | | | |
|---|---|---|---|
| Optical disc to be used | HD DVD | DVD | CD |
| Focal length of objective lens | 2.27 | 2.34 | 2.33 |
| Numerical aperture on image side | 0.65 | 0.65 | 0.51 |
| Optical system magnification of objective lens | 0 | 0 | 0 |

| $i^{th}$ surface | r1 | di (408 nm) | ni (408 nm) | di (660 nm) | ni (660 nm) | di (785 nm) | ni (785 nm) |
|---|---|---|---|---|---|---|---|
| 0 | | ∞ | | ∞ | | ∞ | |
| 1 (Diameter of diaphragm) | ∞ | 0.0 (φ2.95 mm) | | 0.0 (φ3.04 mm) | | 0.0 (φ2.37 nm) | |
| 2-1 | 1.45588 | 1.22 | 1.5587 | 1.22 | 1.5397 | 1.22 | 1.5363 |
| 2-2 | 1.44104 | | | | | | |
| 2-3 | 1.44104 | | | | | | |
| 3 | −9.27008 | 1.19 | | 1.24 | | 0.85 | |
| 4 | ∞ | 0.6 | 1.6183 | 0.6 | 1.5772 | 1.2 | 1.5706 |
| 5 | ∞ | | | | | | |

| 2-1th surface 0 mm < y < 1.19 mm | | |
|---|---|---|
| Aspheric surface coefficient | First optical path difference function (First central basic structure) m (HD: Third order DVD: Second order CD: Second order) | Second optical path difference function (Second central basic structure) m (HD: Second order DVD: First order CD: First order) |
| κ  −5.1932E−01 | λB  445 nm | λB  395 nm |
| A0  0.0000E+00 | C2  −3.0898E−03 | C2  4.0556E−04 |
| A4  −7.5326E−03 | C4  −1.1645E−03 | C4  −2.5514E−04 |
| A6  −1.6290E−03 | C6  −9.0702E−04 | C6  4.4478E−05 |

TABLE 1-continued

| | | | | | |
|---|---|---|---|---|---|
| A8 | 1.3259E−03 | C8 | 8.8635E−04 | C8 | −1.0276E−03 |
| A10 | −1.4206E−03 | C10 | −6.0895E−04 | C10 | 1.1392E−03 |
| A12 | 1.1086E−03 | C12 | 1.4632E−04 | C12 | −4.1341E−04 |
| A14 | −5.8522E−04 | | | | |

| 2-2th surface 1.19 mm < y < 1.477 mm | | | | | |
|---|---|---|---|---|---|
| Aspheric surface coefficient | | First optical path difference function (First peripheral basic structure) m (HD: Third order DVD: Second order) | | Second optical path difference function (Second peripheral basic structure) m (HD: Second order DVD: First order) | |
| κ | 5.1846E−01 | λB | 422 nm | λB | 395 nm |
| A0 | 8.1982E−03 | C2 | −4.2401E−03 | C2 | −1.2151E−03 |
| A4 | −6.0655E−03 | C4 | 1.2735E−04 | C4 | 1.2601E−03 |
| A6 | 1.6501E−03 | C6 | −1.3480E−04 | C6 | 1.1082E−04 |
| A8 | −1.8140E−03 | C8 | −3.9898E−04 | C8 | −5.8287E−04 |
| A10 | 3.4054E−04 | C10 | 8.6824E−05 | C10 | 1.3273E−04 |
| A12 | −2.8349E−04 | C12 | 8.4209E−06 | C12 | 8.9481E−06 |
| A14 | 6.2237E−05 | | | | |

| 2-3th surface 1.477 mm < y | | | |
|---|---|---|---|
| Aspheric surface coefficient | | First optical path difference function (First outermost basic structure) m (DVD: Third order) | |
| κ | −5.1846E−01 | λB | 660 nm |
| A0 | −8.1982E−03 | C2 | −5.0978E−03 |
| A4 | −6.0655E−03 | C4 | 8.3461E−04 |
| A6 | 1.6501E−03 | C6 | −7.8823E−05 |
| A8 | −1.8140E−03 | C8 | −7.4064E−04 |
| A10 | 3.4054E−04 | C10 | 1.6445E−04 |
| A12 | −2.8349E−04 | C12 | 1.3764E−05 |
| A14 | 6.2237E−05 | | |

* Displacement from $i^{th}$ surface to $(i+1)^{th}$ surface is represented by di.

Meanwhile, an optical surface of the objective optical element is formed in an aspheric shape that is axially symmetric around the optical axis and is defined by the numerical expression obtained by substituting the coefficients shown in Table 1 for the following expression of Numeral 1. An optical path length to be given to a light flux having each wavelength by the first and second optical path difference providing structures is defined by a numerical expression obtained by substituting coefficients shown in Table 1 for the optical path difference function represented by the following Numeral 2.

$$z=(y^2/\gamma)/[1+\sqrt{1-(\kappa+1)(y/\gamma)^2}]+A_4y^4+A_6y^6+A_8y^8+A_{10}y^{10}+A_{12}y^{12}+A_{14}y^{14}+A_{16}y^{16}+A_{18}y^{18}+A_{20}y^{20} \quad \text{(Numeral 1)}$$

In the expression above, z represents an aspheric shape (a distance in the direction parallel with the optical axis from a plane that is tangent to an aspheric surface at its vertex), y represents a distance from the optical axis, γ represents a curvature radius, κ represents a conic constant and each of $A_4$, $A_6$, $A_8$, $A_{12}$, $A_{14}$, $A_{16}$, $A_{18}$ and $A_{20}$ is an aspheric surface coefficient.

$$\phi=dor\times\lambda/\lambda_B\times(C_2y^2+C_4y^4+C_6y^6+C_8y^8+C_{10}y^{10}+C_{12}y^{12}) \quad \text{(Numeral 2)}$$

In the expression above, φ represents an optical path difference function, λ represents a wavelength of a light flux entering a diffractive structure, $\lambda_B$ represents a blaze wavelength, dor represents a diffraction order of a diffracted light flux used for recording and reproducing information for an optical disc, y represents a distance from the optical axis and each of $C_2$, $C_4$, $C_6$, $C_8$, $C_{10}$ and $C_{12}$ is a coefficient of optical path difference function. Incidentally, the expressions of Numeral 1 and Numeral 2 are similarly applied to the following Example 2.

Example 2

In Example 2, an objective optical element as a single lens is provided. On the central area of an optical surface of the objective optical element, there is formed the first optical path difference providing structure in which the first central basic structure and the second central basic structure are overlapped with each other. On the peripheral area, there is formed the second optical path difference providing structure in which the first peripheral basic structure and the second peripheral basic structure are overlapped with each other. On the most peripheral area, there is formed the first most peripheral basic structure. Lens data of the Example 2 are shown on Table 2. Further, the 2-1th surface is the central area, the 2-2th surface is the peripheral area and the 2-3th surface is the most peripheral area.

TABLE 2

Example 2

| Optical disc to be used | HD DVD | DVD | CD |
|---|---|---|---|
| Focal length of objective lens | 1.85 | 1.90 | 1.89 |
| Numerical aperture on image side | 0.65 | 0.65 | 0.51 |
| Optical system magnification of objective lens | 0 | 0 | 0 |

| $i^{th}$ surface | r1 | di (408 nm) | ni (408 nm) | di (660 nm) | ni (660 nm) | di (785 nm) | ni (785 nm) |
|---|---|---|---|---|---|---|---|
| 0 | ∞ | | | | | | |
| 1 (Diameter of diaphragm) | ∞ | 0.0 (φ2.40 mm) | | 0.0 (φ2.47 mm) | | 0.0 (φ2.02 mm) | |
| 2-1 | 1.21636 | 1.15 | 1.5587 | 1.15 | 1.5397 | 1.15 | 1.5363 |
| 2-2 | 1.21707 | | | | | | |
| 2-3 | 1.21707 | | | | | | |
| 3 | −6.07268 | 0.82 | | 0.85 | | 0.46 | |
| 4 | ∞ | 0.6 | 1.6183 | 0.6 | 1.5772 | 1.2 | 1.5706 |
| 5 | ∞ | | | | | | |

2-1th surface 0 mm < y < 1.015 mm

| Aspheric surface coefficient | | First optical path difference function (First central basic structure) m (HD: Third order DVD: Second order CD: Second order) | | Second optical path difference function (Second central basic structure) m (HD: Second order DVD: First order CD: First order) | |
|---|---|---|---|---|---|
| κ | −5.2267E−01 | λB | 445 nm | λB | 395 nm |
| A0 | 0.0000E+00 | C2 | 5.0000E−03 | C2 | 1.0700E−03 |
| A4 | −1.3732E−02 | C4 | 1.9561E−03 | C4 | −3.3550E−03 |
| A6 | −8.1690E−03 | C6 | −2.7491E−03 | C6 | 3.2206E−03 |
| A8 | 1.0796E 02 | C8 | 4.5649E−04 | C8 | −2.1713E−03 |
| A10 | −2.0887E−02 | C10 | 1.0209E−03 | C10 | −1.3456E−03 |
| A12 | 1.1896E−02 | C12 | −6.7811E−04 | C12 | 1.1413E−03 |
| A14 | −3.0907E−03 | | | | |

2-2th surface 1.015 mm < y < 1.204 mm

| Aspheric surface coefficient | | First optical path difference function (First peripheral basic structure) m (HD: Third order DVD: Second order) | | Second optical path difference function (Second peripheral basic structure) m (HD: Second order DVD: First order) | |
|---|---|---|---|---|---|
| κ | −5.3953E−01 | λB | 422 nm | λB | 395 nm |
| A0 | −4.2057E−03 | C2 | −6.1506E−03 | C2 | −1.9863E−03 |
| A4 | −1.4100E−02 | C4 | −4.8170E−04 | C4 | 2.4599E−03 |
| A6 | 8.2090E−03 | C6 | −1.1667E−03 | C6 | −5.0226E−04 |
| A8 | −6.0246E−03 | C8 | −6.8704E−04 | C8 | −1.4554E−03 |
| A10 | 7.3556E−04 | C10 | 3.6861E−04 | C10 | 4.2913E−05 |
| A12 | −4.0230E−03 | C12 | 2.4860E−05 | C12 | 3.2573E−04 |
| A14 | 1.9127E−03 | | | | |

2-3th surface 1.204 mm < y

| Aspheric surface coefficient | | First optical path difference function (First outermost basic structure) m (DVD: Third order) | |
|---|---|---|---|
| κ | −5.3953E−01 | λB | 660 nm |
| A0 | −4.2057E−03 | C2 | −7.5280E−03 |
| A4 | −1.4100E−02 | C4 | 8.7632E−04 |
| A6 | 8.2090E−03 | C6 | −1.4872E−03 |
| A8 | 6.0246E−03 | C8 | −1.5348E−03 |
| A10 | 7.3556E−04 | C10 | 4.0434E−04 |
| A12 | −4.0230E−03 | C12 | 2.1024E−04 |
| A14 | 1.9127E−03 | | |

\* Displacement from $i^{th}$ surface to $(i+1)^{th}$ surface is represented by di.

Table 3 collectively indicates the values relating to the present invention, for each Example.

TABLE 3

| Example | a, b, c | X, Y, Z | m1, m2, m3 | Existence of step differences satisfying any of expressions (4), (5) and (6) |
|---------|---------|---------|------------|---------------------------------------------------------------------|
| 1 | 3, 2, 2 | 2, 1, 1 | 0, 0, 0 | (4), (5), (6) |
| 2 | 3, 2, 2 | 2, 1, 1 | 0, 0, 0 | (4), (5), (6) |

The invention claimed is:

1. An objective optical element for use in an optical pickup apparatus which forms a converged spot on an information recording surface of a first optical information recording medium comprising a protective layer with a thickness of t1, by using a first light flux with a wavelength of λ1 emitted from a first light source,
    forms a converged spot on an information recording surface of a second optical information recording medium comprising a protective layer with a thickness of t2 (t1≦t2), by using a second light flux with a wavelength of λ2 (λ1<λ2) emitted from a second light source, and
    forms a converged spot on an information recording surface of a third optical information recording medium comprising a protective layer with a thickness of t3 (t2<t3), by using a third light flux with a wavelength of λ3 (1.9×λ1<λ3<2.1×λ1) emitted from a third light source, the objective optical element comprising:
    an optical functional surface,
    wherein the objective optical element is a single lens,
    an optical functional surface comprises:
    at least two areas of a central area comprising an optical axis and a peripheral area surrounding the central area, the central area being used for forming the converged spot on each of the information recording surfaces of the first optical information recording medium, the second optical information recording medium, and the third optical information recording medium, and the peripheral area is used for forming the converged spot on only the information recording surfaces of the first optical information recording medium and the second optical information recording medium out of the first optical information recording medium, the second optical information recording medium and the third optical information recording medium,
    the central area comprises a first central basic structure being a structure in a shape of ring-shaped zones divided by step differences and a second central basic structure being a structure in a shape of ring-shaped zones divided by step differences, where the first central basic structure and the second central basic structure are formed to be overlapped with each other,
    in the first central basic structure, an a-th order diffracted light flux has a higher light intensity than other order diffracted light fluxes when the first light flux passes through the first central basic structure, a b-th order diffracted light flux has a higher light intensity than other order diffracted light fluxes when the second light flux passes through the first central basic structure, and a c-th order diffracted light flux has a higher light intensity than other order diffracted light fluxes when the third light flux passes through the first central basic structure, and
    in the second central basic structure, a x-th order diffracted light flux has a higher light intensity than other order diffracted light fluxes when the first light flux passes through the second central basic structure, a y-th order diffracted light flux has a higher light intensity than other order diffracted light fluxes when the second light flux passes through the second central basic structure, and a z-th order diffracted light flux has a higher light intensity than other order diffracted light fluxes when the third light flux passes through the second central basic structure,
    the peripheral area comprises a first peripheral basic structure being a structure in a shape of ring-shaped zones divided by step differences and a second peripheral basic structure being a structure in a shape of ring-shaped zones divided by step differences, where the first peripheral basic structure and the second peripheral basic structure are formed to be overlapped with each other,
    in the first peripheral basic structure, an a-th order diffracted light flux has a higher light intensity than other order diffracted light fluxes when the first light flux passes through the first peripheral basic structure, and a b-th order diffracted light flux has a higher light intensity than other order diffracted light fluxes when the second light flux passes through the first peripheral basic structure, and
    in the second peripheral basic structure, a x-th order diffracted light flux has a higher light intensity than other order diffracted light fluxes when the first light flux passes through the second peripheral basic structure, and a y-th order diffracted light flux has a higher light intensity than other order diffracted light fluxes when the second light flux passes through the second peripheral basic structure, and
    the a of the a-th order diffracted light flux of the first central basic structure and the a of the a-th order diffracted light flux of the first peripheral basic structure are the same, the b of the b-th order diffracted light flux of the first central basic structure and the b of the b-th order diffracted light flux of the first peripheral basic structure are the same, the x of the x-th order diffracted light flux of the second central basic structure and the x of the x-th order diffracted light flux of the second peripheral basic structure are the same, and the y of the y-th order diffracted light flux of the second central basic structure and the y of the y-th order diffracted light flux of the second peripheral basic structure are the same, and
    values of the a is one of 1, 3 and 5, and
    values of the x is one of 2, 4 and 6.

2. The objective optical element of claim 1, wherein the objective optical element is used in the optical pickup apparatus in which m1, m2, and m3 have an almost same value to each other, where m1, m2, and m3 are magnifications for the first light flux, the second light flux, and the third light flux which enter the objective optical element, respectively.

3. The objective optical element of claim 2, wherein the following expressions (1), (2), and (3) are satisfied:

$$-0.02 < m1 < 0.02, \quad (1)$$

$$-0.02 < m2 < 0.02, \quad (2)$$

$$-0.02 < m3 < 0.02. \quad (3)$$

4. The objective optical element of claim 1, satisfying the following relationships:

$$a=1, b=1, c=1,$$

$$x=2, y=1, z=1.$$

5. The objective optical element of claim 1, wherein an average pitch of a structure formed by the first central basic structure and the second central basic structure overlapped with each other, is larger than an average pitch of a structure formed by the first peripheral basic structure and the second peripheral basic structure overlapped with each other.

6. The objective optical element of claim 1, wherein an optical surface on which the ring-shaped zones are formed faces a light-source side.

7. The objective optical element of claim 1, further comprising a most peripheral area surrounding the peripheral area,
wherein the most peripheral area is used for forming a converged spot only on the information recording surface of the first optical information recording medium.

8. The objective optical element of claim 1, wherein each of the first central basic structure, the second central basic structure, the first peripheral basic structure, and the second peripheral basic structure is a diffractive structure in a serrated shape.

9. The objective optical element of claim 1,
wherein the thickness t1 of the protective layer of the first optical information recording medium satisfies 0.0750 mm≦t1≦0.1125 mm,
the thickness t2 of the protective layer of the second optical information recording medium satisfies 0.5 mm≦t2≦0.7 mm, and
the thickness t3 of the protective layer of the third optical information recording medium satisfies 1.1 mm≦t3≦1.3 mm.

10. The objective optical element of claim 1, wherein the objective optical element comprises a glass material.

11. The objective optical element of claim 1, wherein the objective optical element comprises a plastic material.

12. An optical pickup apparatus comprising:
a first light source for emitting a first light flux with a wavelength of $\lambda 1$;
a second light source for emitting a second light flux with a wavelength of $\lambda 2$ ($\lambda 1 < \lambda 2$);
a third light source for emitting a third light flux with a wavelength of $\lambda 3$ ($1.9 \times \lambda 1 < \lambda 3 < 2.1 \times \lambda 1$); and
an objective optical element of claim 1 being a single lens,
wherein the optical pickup apparatus
forms a converged spot on an information recording surface of a first optical information recording medium comprising a protective layer with a thickness of t1, by using the first light flux with the wavelength of $\lambda 1$ emitted from the first light source,
forms a converged spot on an information recording surface of a second optical information recording medium comprising a protective layer with a thickness of t2 (t1≦t2), by using the second light flux with the wavelength of $\lambda 2$ emitted from the second light source, and
forms a converged spot on an information recording surface of a third optical information recording medium comprising a protective layer with a thickness of t3 (t2<t3), by using the third light flux with the wavelength of $\lambda 3$ emitted from the third light source, and
m1, m2, and m3 have an almost same value to each other, where m1, m2, and m3 are magnifications for the first light flux, the second light flux, and the third light flux which enter the objective optical element, respectively.

13. An objective optical element for use in an optical pickup apparatus which forms a converged spot on an information recording surface of a first optical information recording medium comprising a protective layer with a thickness of t1, by using a first light flux with a wavelength of $\lambda 1$ emitted from a first light source,
forms a converged spot on an information recording surface of a second optical information recording medium comprising a protective layer with a thickness of t2 (t1≦t2), by using a second light flux with a wavelength of $\lambda 2$ ($\lambda 1 < \lambda 2$) emitted from a second light source, and
forms a converged spot on an information recording surface of a third optical information recording medium comprising a protective layer with a thickness of t3 (t2<t3), by using a third light flux with a wavelength of $\lambda 3$ ($1.9 \times \lambda 1 < \lambda 3 < 2.1 \times \lambda 1$) emitted from a third light source,
the objective optical element comprising:
an optical functional surface,
wherein the objective optical element is a single lens,
an optical functional surface comprises:
at least two areas of a central area comprising an optical axis and a peripheral area surrounding the central area, the central area being used for forming the converged spot on each of the information recording surfaces of the first optical information recording medium, the second optical information recording medium, and the third optical information recording medium, and the peripheral area is used for forming the converged spot on only the information recording surfaces of the first optical information recording medium and the second optical information recording medium out of the first optical information recording medium, the second optical information recording medium and the third optical information recording medium,
each of the central area and the peripheral area comprises a structure in a shape of ring-shaped zones divided by step differences, and
step differences between adjoining ring-shaped zones in the central area have at least two types of length along an optical axis out of d1 (μm) and d2 (μm) satisfying the expressions (7) and (8), and
step differences between adjoining ring-shaped zones in the peripheral area have at least two types of length along an optical axis out of d1 (μm) and d2 (μm) satisfying the expressions (7) and (8):

$$0.7 < |d1[1 - n \cdot \cos\{\theta - \arcsin(\sin\theta/n)\}]/\lambda 1| < 1.5, \quad (7)$$

$$1.6 < |d2[1 - n \cdot \cos\{\theta - \arcsin(\sin\theta/n)\}]/\lambda 1| < 2.4, \quad (8)$$

where n is a refractive index of the objective optical element for a light flux with the wavelength $\lambda 1$ (μm), and
θ is a surface angle of a base aspheric surface of the optical functional surface of the objective optical element, at a corresponding step difference.

14. The objective optical element of claim 13, wherein the step differences of the ring-shaped zones have at least two types of length along the optical axis out of d1 (μm) and d2 (μm) satisfying the expressions (7') and (8') respectively:

$$0.9 < |d1[1 - n \cdot \cos\{\theta - \arcsin(\sin\theta/n)\}]/\lambda 1| < 1.3 \quad (7')$$

$$1.8 < |d2[1 - n \cdot \cos\{\theta - \arcsin(\sin\theta/n)\}]/\lambda 1| < 2.2 \quad (8')$$

15. The objective optical element of claim 13, wherein an optical surface on which the ring-shaped zones are formed faces a light-source side.

16. The objective optical element of claim 13, further comprising a most peripheral area surrounding the peripheral area, wherein the most peripheral area is used for forming a converged spot only on the information recording surface of the first optical information recording medium.

17. The objective optical element of claim 13, wherein each of the first central basic structure, the second central basic structure, the first peripheral basic structure, and the second peripheral basic structure is a diffractive structure in a serrated shape.

18. The objective optical element of claim 13,
wherein the thickness t1 of the protective layer of the first optical information recording medium satisfies $0.0750$ mm$\leq$t1$\leq$0.1125 mm,
the thickness t2 of the protective layer of the second optical information recording medium satisfies 0.5 mm$\leq$t2$\leq$0.7 mm, and
the thickness t3 of the protective layer of the third optical information recording medium satisfies 1.1 mm$\leq$t3$\leq$1.3 mm.

19. The objective optical element of claim 13, wherein the objective optical element comprises a glass material.

20. The objective optical element of claim 13, wherein the objective optical element comprises a plastic material.

21. An optical pickup apparatus comprising:
a first light source for emitting a first light flux with a wavelength of $\lambda 1$;
a second light source for emitting a second light flux with a wavelength of $\lambda 2$ ($\lambda 1 < \lambda 2$);
a third light source for emitting a third light flux with a wavelength of $\lambda 3$ ($1.9 \times \lambda 1 < \lambda 3 < 2.1 \times \lambda 1$); and
an objective optical element of claim 13 being a single lens,
wherein the optical pickup apparatus
forms a converged spot on an information recording surface of a first optical information recording medium comprising a protective layer with a thickness of t1, by using the first light flux with the wavelength of $\lambda 1$ emitted from the first light source,
forms a converged spot on an information recording surface of a second optical information recording medium comprising a protective layer with a thickness of t2 (t1$\leq$t2), by using the second light flux with the wavelength of $\lambda 2$ emitted from the second light source, and
forms a converged spot on an information recording surface of a third optical information recording medium comprising a protective layer with a thickness of t3 (t2<t3), by using the third light flux with the wavelength of $\lambda 3$ emitted from the third light source, and
m1, m2, and m3 have an almost same value to each other, where m1, m2, and m3 are magnifications for the first light flux, the second light flux, and the third light flux which enter the objective optical element, respectively.

* * * * *